United States Patent [19]
Woo

[11] Patent Number: 5,664,858
[45] Date of Patent: Sep. 9, 1997

[54] METHOD AND APPARATUS FOR PRE-COMPENSATING AN ASYMMETRICAL PICTURE IN A PROJECTION SYSTEM FOR DISPLAYING A PICTURE

[75] Inventor: Seong-Jae Woo, Kyeongki-do, Rep. of Korea

[73] Assignee: Daewoo Electronics Co., Inc., Seoul, Rep. of Korea

[21] Appl. No.: 686,100

[22] Filed: Jul. 24, 1996

[30] Foreign Application Priority Data

Jul. 25, 1995 [KR] Rep. of Korea ............ 95-22008

[51] Int. Cl.[6] ........................................ G03B 21/14
[52] U.S. Cl. .................................... 353/69; 353/70
[58] Field of Search ................... 353/69, 70, 122; 348/745, 746, 747

[56] References Cited

U.S. PATENT DOCUMENTS

| | | | |
|---|---|---|---|
| 4,422,153 | 12/1983 | Arai et al. | 353/70 |
| 5,283,602 | 2/1994 | Kwon | 353/69 |
| 5,355,188 | 10/1994 | Biles et al. | 353/69 |
| 5,414,480 | 5/1995 | Morizumi | 353/70 |
| 5,455,647 | 10/1995 | Fujiwara | 353/69 |

FOREIGN PATENT DOCUMENTS 4355740  12/1992  Japan .................... 353/69

*Primary Examiner*—William Dowling
*Attorney, Agent, or Firm*—Foley & Lardner

[57] ABSTRACT

An apparatus and a method in a projector in which in order to project a clear picture onto a screen without the occurrence of the keystoning, an asymmetrical picture is pre-compensated is disclosed. In the apparatus and method for pre-compensating an asymmetrical picture in a projector, when the projection lens of the projector is arranged at an upward or a downward projection angle, regardless of the projection angle, a trapezoidal error of the picture projected on the screen is pre-compensated in response to the projection angle setting signal from the projection angle setting section, so that the picture is normally projected onto the screen (e.g., a picture in the shape of a rectangle). Consequently, the performance or structural flexibility of the projector is enhanced by using digital circuits and softwares therefor.

22 Claims, 8 Drawing Sheets

METHOD AND APPARATUS FOR PRE-COMPENSATING AN ASYMMETRICAL PICTURE IN A PROJECTION SYSTEM FOR DISPLAYING A PICTURE

BACKGROUND OF THE INVENTION

1. Field of the Invention

The present invention relates to an apparatus and a method for pre-compensating an asymmetrical picture so that in a projection system for displaying a picture, a normal picture is provided regardless of the projection angle of a projection lens with respect to a screen.

2. Description of the Prior Art

Generally, a picture display system for displaying a color picture is divided broadly into direct-view picture display systems represented by CRTs (Cathode Ray Tubes), and projection systems for displaying a picture (hereinafter, referred to as "projectors") represented by LCDs (Liquid Crystal Displays). Since CRTs are restricted in its size due to its inherent structure, they cannot provide large-scale color screens. On the other hand, LCDs are able to provide large-scale color screens with slim and light structures, but they cause an optical loss.

Therefore, a projector has been widely used. This projector breaks up a color picture signal according to color into RGB light signals, and optically adjusts the RGB signal broken up according to color on the basis of the components of the color signal. The picture signal which is optically adjusted, is magnified via a projection lens and is displayed on a relatively large-scale screen.

Figure 1:
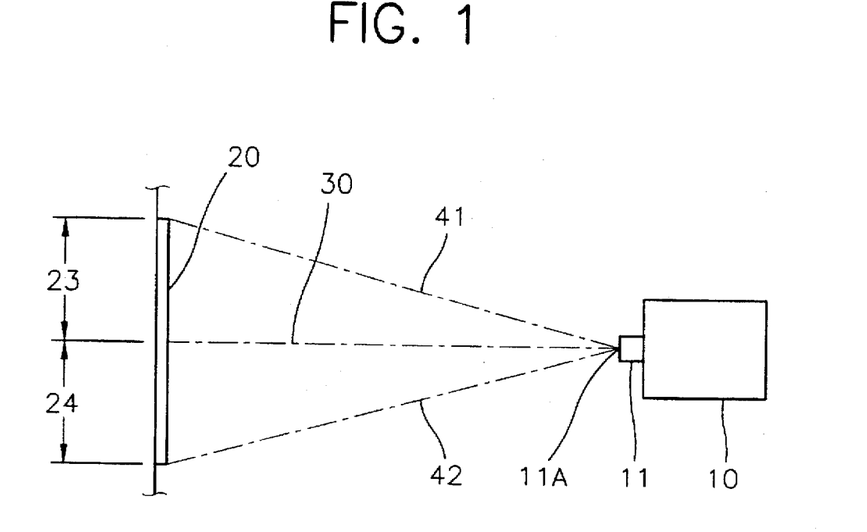
FIGS. 1 and 2 are respectively views for showing the arrangement of a projection lens with respect to a screen and the shape of a picture projected onto the screen in the projector when the picture projected onto the screen is normal.
Figure 2:
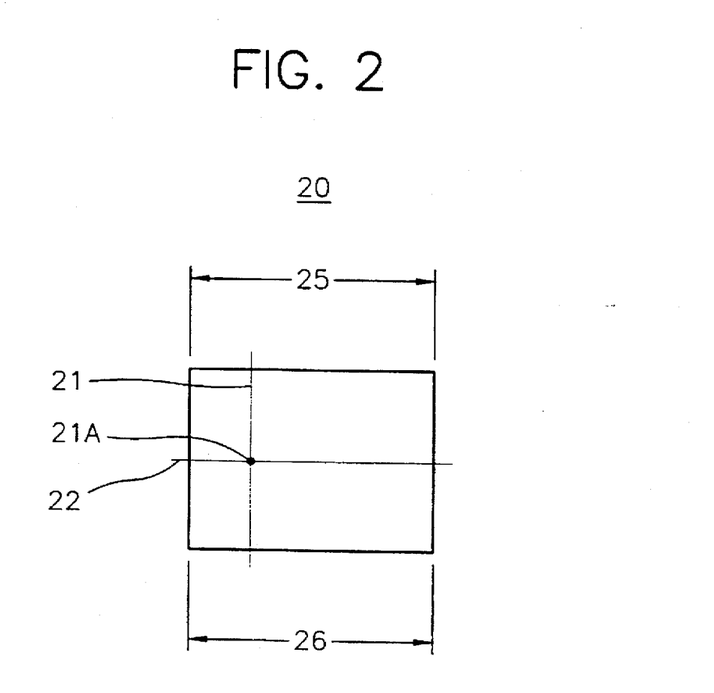

FIGS. 1 and 2 are respectively views for showing the arrangement of a projection lens with respect to a screen and the shape of a picture projected onto the screen in the projector when the picture projected onto the screen is normal. As shown in FIGS. 1 and 2, a center axis 30 is a line connecting a point on a first traverse axis 22 which crosses at right angles a midpoint point 21A of a first longitudinal axis 21 on a screen 20, with a center point 11A of a projection lens 11 of a projector 10. When center axis 30 forms an approximate right angle with the surface of screen 20, a first projection distance 41 which ranges from center point 11A of projection lens 11 to an upper end of the picture, i.e., screen 20, becomes equal to a second projection distance 42 which ranges from center point 11A of projection lens 11 to a lower end of the picture, i.e., screen 20. Also, a third distance 23 which ranges from center axis 30 to the upper end of the picture, i.e., screen 20, becomes equal to a fourth distance 24 which ranges from center axis 30 to the lower end of the picture, i.e., screen 20, so that a width 25 of the upper end of the picture becomes approximately equal to a width 26 of the lower end of the picture. As a result, as a whole, the picture is projected in the shape of a rectangle onto screen 20 without keystoning or trapezoidal distortion.

Figure 3:
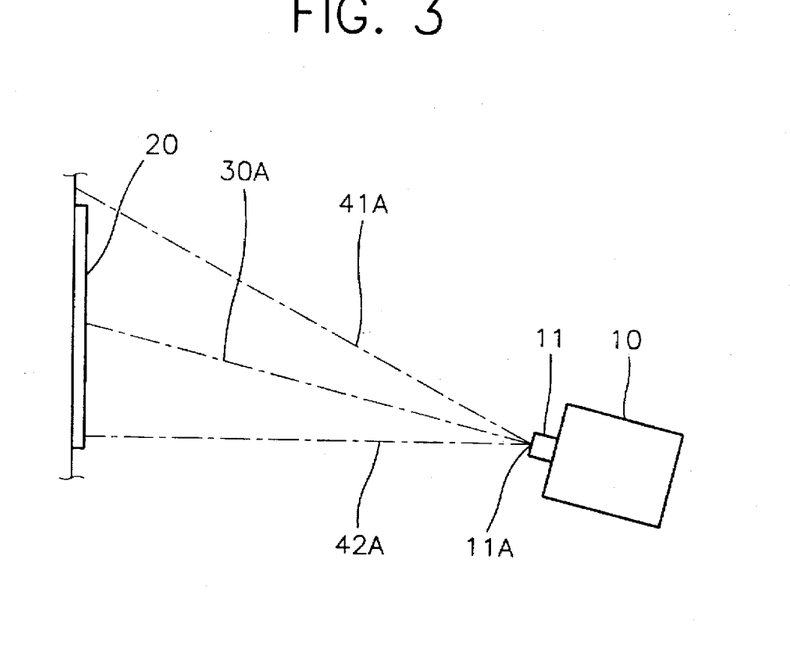
FIGS. 3 and 4 are respectively views for showing an arrangement of the projection lens with respect to the screen and the shape of the picture projected onto the screen in the projector when the projection lens has an upward projection angle with respect to the screen.
Figure 4:
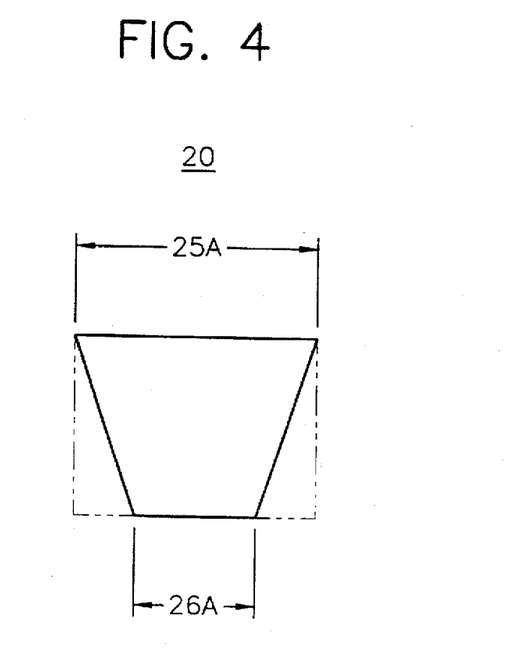

FIGS. 3 and 4 are respectively views for showing an arrangement of the projection lens with respect to the screen and the shape of the picture projected onto the screen in the projector when the projection lens has an upward projection angle with respect to the screen. As shown in FIGS. 3 and 4, when projection lens 11 of projector 10 is placed below a first plane (not shown) which vertically traverses first longitudinal axis 22 with reference to the surface of screen 20, a center axis 30A has an upward projection angle with reference to the first plane. At this time, a first projection distance 41A is different from a second projection distance 42A, and the picture projected onto screen 20 has the shape of a reverse trapezoid in that a width 25A of the upper end thereof is wider than a width 26A of the lower end thereof.

Figure 5:
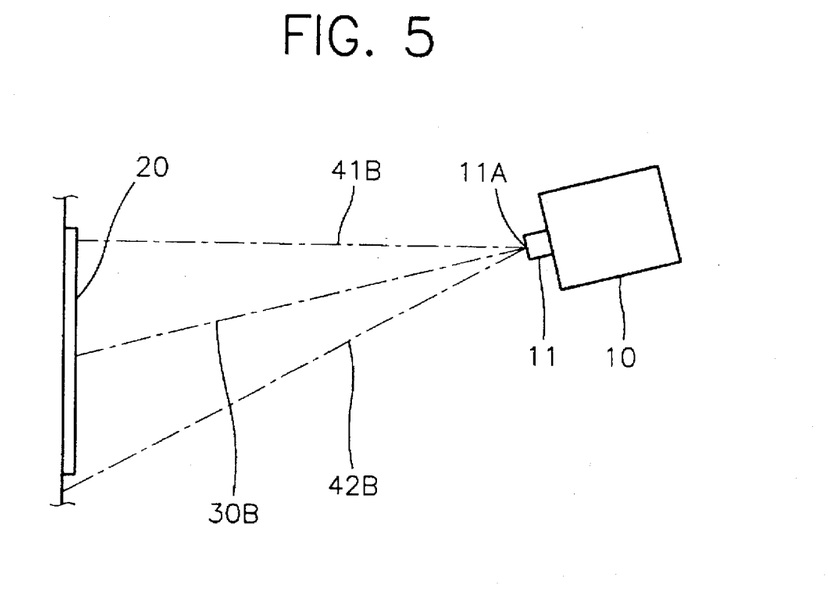
FIGS. 5 and 6 are respectively views for showing an arrangement of the projection lens with respect to the screen and the shape of the picture projected onto the screen in the projector when the projection lens has an downward projection angle with respect to the screen.
Figure 6:
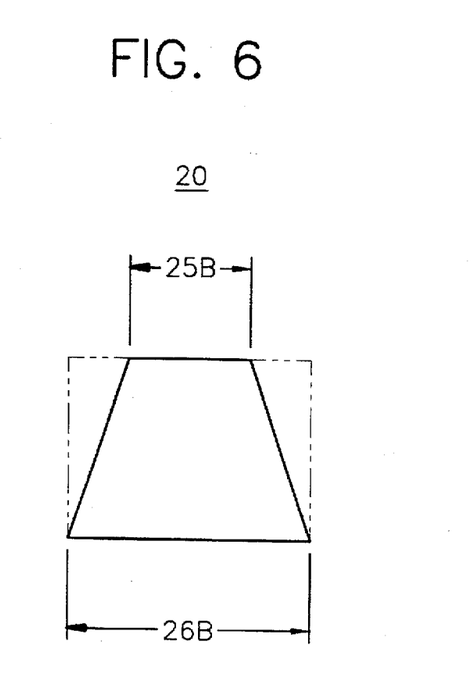

FIGS. 5 and 6 are respectively views for showing an arrangement of the projection lens with respect to the screen and the shape of the picture projected onto the screen in the projector when the projection lens has an downward projection angle with respect to the screen. As shown in FIGS. 5 and 6, when projection lens 11 of projector 10 is placed above a first plane (not shown) which vertically traverses first longitudinal axis 22 with reference to the surface of screen 20, a center axis 30A has a downward projection angle with reference to the first plane. At this time, a first projection distance 41B is different from a second projection distance 42B, and the picture projected onto screen 20 has the shape of a trapezoid in that a width 25B of the upper end thereof is smaller than a width 26B of the lower end thereof, contrary to the picture in FIG. 4.

As described above, when the projection lens of the projector is arranged at an upward or downward projection angle with respect to the screen, the magnified picture that is projected onto screen 20 is distorted due to the keystoning or the trapezoidal error. In the end, the distorted picture will inevitably irritate a user, so pre-compensation for an asymmetrical or distorted picture that is projected onto the screen due to occurrence of the keystoning, is required.

For example, U.S. Pat. No. 5,355,188 discloses an apparatus and a method for compensating or correcting the trapezoidal error on the screen in the projector. In the disclosed apparatus and method, the trapezoidal error is eliminated by maintaining an optical center of a field lens on the optical axis of the projection lens.

As another example, U.S. Pat. No. 5,283,602 discloses an apparatus for compensating the trapezoidal error on the screen in the projector. In the disclosed apparatus, an optical path diversifying mirror is arranged at an inclined angle of 45° with respect to an optical path of a light and is also arranged so that it can be moved in a direction parallel to the optical path toward or away from a projected object, thereby the image is projected upwardly or downwardly without the occurrence of the trapezoidal distortion on the screen.

However, in order to solve the trapezoidal distortion on the screen, the aforementioned configurations take an optical or a mechanical approach, so their performance or structural flexibility are restricted.

SUMMARY OF THE INVENTION

Therefore, it is a first object of the present invention to provide an apparatus for pre-compensating an asymmetrical picture in which the trapezoidal error, i.e., the trapezoidal distortion, of the picture projected on the screen, is pre-compensated in response to a projection angle setting signal, i.e., key data, provided by a projecting angle setting section regardless of the arrangement of a projection lens with respect to the screen in a projection system for displaying a picture.

It is a second object of the present invention to provide a method for pre-compensating an asymmetrical picture executed by the apparatus.

In order to achieve the above first object, the present invention provides an apparatus for pre-compensating an asymmetrical picture in a projection system for displaying a picture, which comprises:

means for setting an projection angle and providing a projection angle setting signal when a central axis of a projection lens installed in a projector for projecting a magnified picture on a screen is arranged at an upward or downward projection angle with respect to the screen;

controlling means for providing a control signal in order to control an operation of pre-compensating an asymmetry of the picture which will be projected on the screen on the basis of the projection angle setting signal of the projection angle setting means;

control clock generating means for providing a record/read clock signal and a data conversion output signal in accordance with the control signal from the controlling means while receiving a main clock signal and a digital signal process clock signal, the write clock signal relating to a process for deleting pixels of the picture signal data;

first switching means for switching the record/read clock signal from the control clock generating means and for providing a switched write clock signal or a switched read clock signal in accordance with the control signal from the controlling means while receiving the digital signal process clock signal, the switched write clock signal relating to the process for deleting pixels of the picture signal data;

memory section for recording the picture signal data which has pixels deleted therefrom and is provided in response to a horizontal synchronizing signal, the memory section outputting the recorded picture signal data while receiving the switched write clock signal or the switched read clock signal from the first switching means;

second switching means for switching in accordance with the control signal from the controlling means between the picture signal data outputted from the memory section in response to the switched read clock signal from the first switching means, and blanking data filled in blanking areas set prior to and after the picture signal data having pixels deleted therefrom, and for providing a switched picture signal data or a switched blanking data;

third switching means for switching the data conversion output signal from the control clock generating means and providing a switched data conversion output signal in accordance with the control signal from the controlling means while receiving the digital signal process clock signal; and data converting means for inputting the switched picture signal data or the switched blanking data from the second switching means in order to form the picture signal data having blanking data added thereto, and for converting the picture signal data having blanking data added thereto into an analog signal, after a first period, in response to switched data conversion output signal from the third switching means, in order to provide a converted picture signal data.

In order to achieve the above second object, the present invention provides a method for pre-compensating an asymmetrical picture in a projection system for displaying a picture, which comprises the steps of:

(i) inputting a key data corresponding to a projection angle setting signal when a central axis of a projection lens installed in a projector for projecting a magnified picture on a screen is arranged at an upward or downward projection angle with respect to the screen;

(ii) calculating on the basis of the key data inputted in step (i) parameters related to an operation for pre-compensating an asymmetry of a picture which will be projected onto the screen;

(iii) generating a write clock signal at a leading edge of a main clock signal in accordance with the amount of compensation determined in step (ii);

(iv) recording a picture signal data with pixels deleted therefrom in the line of unit in response to the write clock signal generated in step (iii) in order to generate a picture reversely shaped to the picture which will be projected onto the screen;

(v) generating a read clock signal at a leading edge of the main clock signal after a first period multiplied by 2 in order to read out the picture signal data;

(vi) adding a blanking data to parts of the read picture signal data with pixels deleted therefrom in response to the read clock signal generated in step (v); and (vii) converting in response to a data conversion output signal the picture signal data having the blanking data added thereto generated in step (vi) into an analog signal and generating a converted picture signal data.

In the apparatus and method for pre-compensating an asymmetrical picture in a projection system for displaying a picture, when the projection lens of the projector is arranged at an upward or a downward projection angle, regardless of the projection angle, the trapezoidal error of the picture projected onto the screen is pre-compensated in response to the projection angle setting signal from the projection angle setting section. Since the trapezoidal error is solved by using circuits and softwares, the performance or structural flexibility of the projector is enhanced.

BRIEF DESCRIPTION OF THE DRAWINGS

The above objects and other advantages of the present invention will become more apparent by describing in detail preferred embodiment thereof with reference to the attached drawings, in which.

DESCRIPTION OF THE PREFERRED EMBODIMENT

A description will be given below in detail with reference to accompanying drawings to the configuration and the operation of an apparatus and a method for pre-compensating an asymmetrical picture in a projection system for displaying a picture according to an embodiment of the present invention.

Figure 7:
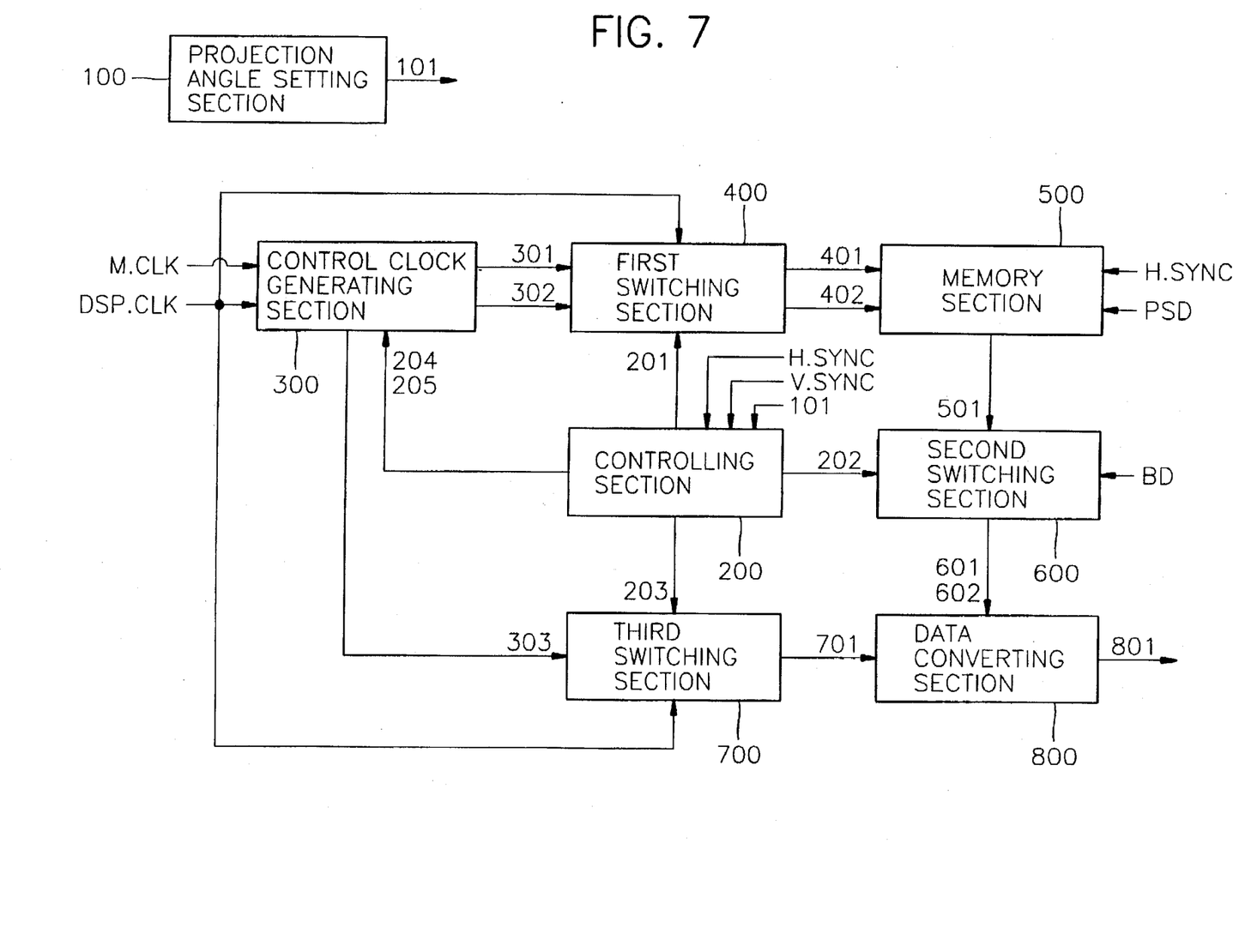
FIG. 7 is a circuit block diagram for showing an apparatus for pre-compensating an asymmetrical picture in a projector according to one embodiment of the present invention.

FIG. 7 is a circuit block diagram for showing an apparatus for pre-compensating an asymmetrical picture in a projector according to one embodiment of the present invention. As shown in FIG. 7, an apparatus for pre-compensating an asymmetrical picture in a projection system for displaying a picture according to the present invention, comprises a projection angle setting section 100, a controlling section 200, a control clock generating section 300, a first switching section 400, a memory section 500, a second switching section 600, a third switching section 700, and a data converting section 800.

Projection angle setting section 100 provides a projection angle setting signal 101 when a center axis 11A of a projection lens 11 installed in a projector 10 for projecting a magnified picture on a screen 20 is arranged at an upward or downward projection angle with respect to screen 20.

Controlling section 200 provides a control signal in order to control an operation of pre-compensating an asymmetry of the picture which will be projected on screen 20 on the basis of projection angle setting signal 101 of projection angle setting section 100.

Control clock generating section 300 provides a write/read clock signal 301 and 302 and a data conversion output signal 303 in accordance with the control signal from controlling section 200 while receiving a main clock signal M.CLK and a digital signal process clock signal DSP.CLK. Write clock signal 301 relates to a process for deleting pixels of a picture signal data PSD.

First switching section 400 switches write/read clock signal 301 and 302 from control clock generating section 300 and provides a switched write clock signal 401 or a switched read clock signal 402 in accordance with the control signal from controlling section 200 while receiving digital signal process clock signal DSP.CLK. Switched write clock signal 401 relates to the process for deleting pixels of picture signal data PSD.

Memory section 500 records picture signal data PSD which has pixels deleted therefrom and is provided in response to a horizontal synchronizing signal H.SYNC and outputs the recorded picture signal data while receiving switched write clock signal 401 or switched read clock signal 402 from first switching section 400.

Second switching section 600 switches in accordance with the control signal from controlling section 200 between picture signal data PSD outputted from memory section 500 in response to switched read clock signal 402 from first switching section 400, and blanking data BD filled in blanking areas set prior to and after picture signal data PSD having pixels deleted therefrom, and provides a switched picture signal data 601 or a switched blanking data 602.

Third switching section 700 switches data conversion output signal 303 from control clock generating section 300 and provides a switched data conversion output signal 701 in accordance with a third switching control signal 203 from controlling section 200 while receiving digital signal process clock signal DSP.CLK.

Data converting section inputs switched picture signal data 601 or switched blanking data 602 from second switching section 600 in order to form picture signal data PSD having blanking data BD added thereto, and converts picture signal data PSD having blanking data BD added thereto into an analog signal, after a blanking period/2, in response to switched data conversion output signal 701 from third switching section 700, in order to provide a converted picture signal data 801.

Controlling section 200 applies to control clock generating section 300 write/readout control signal 301 and 302 in order to control the process for pre-compensating the asymmetry of the picture which will be projected onto screen 20 in response to projection angle setting signal 101 from projection angle setting section 100, a vertical synchronizing signal V.SYNC, and horizontal synchronizing signal H.SYNC of the picture signal when projection lens 11 is arranged at the upward or downward projection angle with respect to screen 20.

Controlling section 200 calculates an amount of compensation, a vertical division in the block of unit, determines a direction of compensation of the picture in the pre-compensating process, and controls the generation of write clock signal 301 from control clock generating section 300.

Controlling section 200 applies to second switching section 600 second switching control signal 202 for adding blanking data BD (see FIG. 11 and FIG. 12) to the parts of the picture signal in the line of unit in which the pixels are deleted on the basis of the amount of compensation in the line of unit.

Controlling section 200 adjusts the waveform of the write clock signal from control clock generating section 300 and controls the process in which the pixels of the picture signal data are deleted in the line of unit in accordance with the amount of compensation in the direction of compensation while recording the picture signal data in memory section 500.

Controlling section 200 controls first switching section 400 in order to read out the picture signal data in the line of unit while the recorded picture signal data is read out from memory section 500 in response to read clock signal 302 from control clock generating section 300. Controlling section 200 adjusts the generation of second switching control signal 202 therefrom in order to add blanking data BD in the direction of compensation prior to and after picture signal data PSD for the blanking period/2 by the switching operation of second switching section 600 while reading out the picture signal data recorded in the line of unit.

The control signal from controlling section 200 includes first switching control signal 201, second switching control signal 202, third switching control signal 203, and record/readout control signal 204 and 205.

Figure 11:
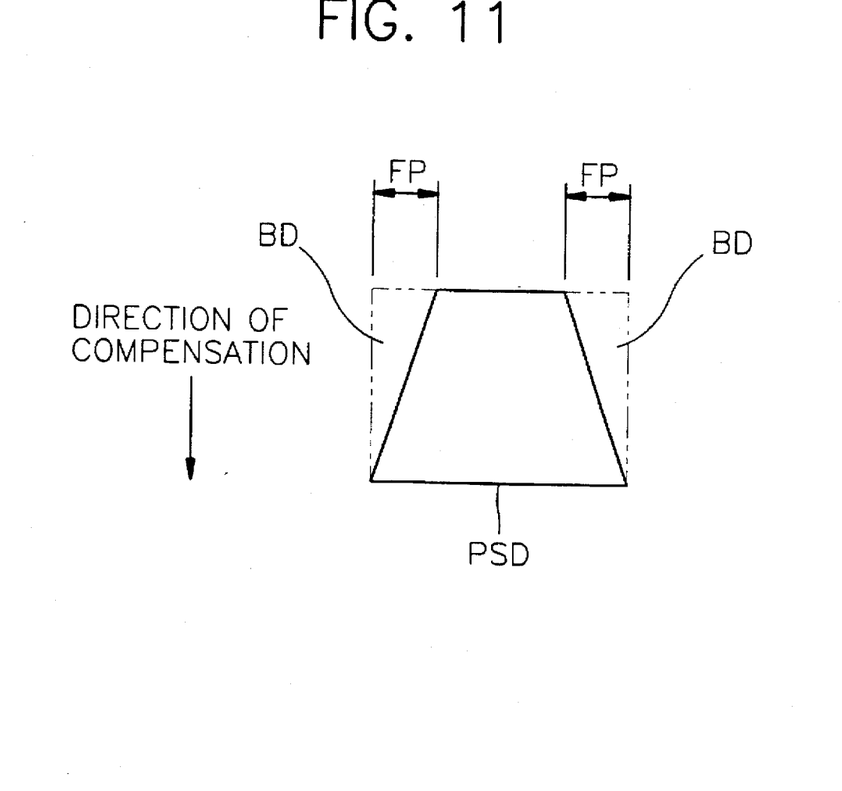
FIG. 11 is a view for illustrating a pre-compensated picture signal when the projection lens is arranged as shown in FIG. 3.
Figure 12:
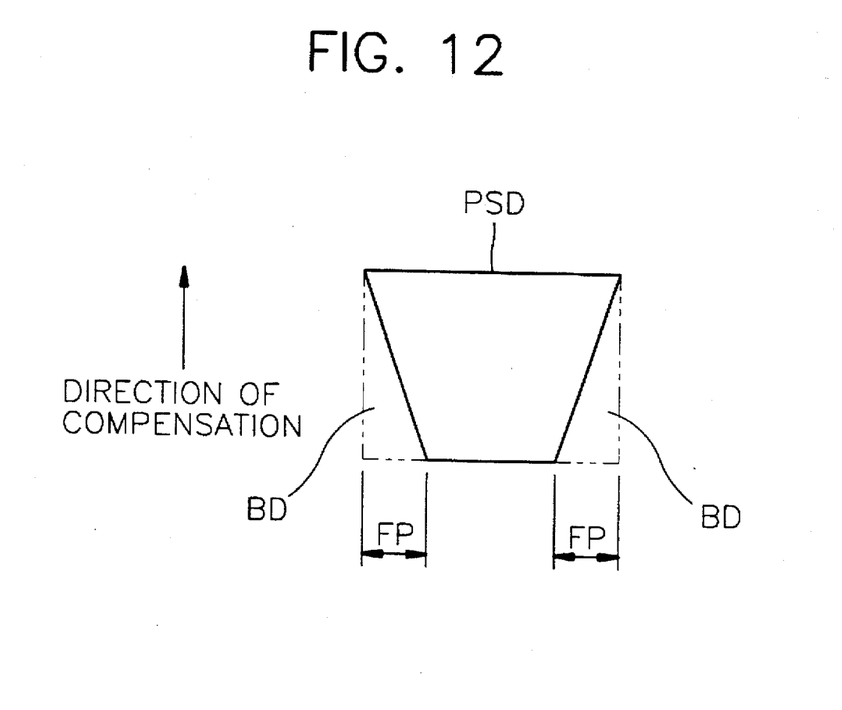
FIG. 12 is a view for illustrating a pre-compensated picture signal when the projection lens is arranged as shown in FIG. 5.

Control clock generating section 300 provides write clock signal 301 for controlling the recording in memory section 500 picture signal data PSD with the pixels deleted therefrom (see FIGS. 11 and 12) in the line of unit in accordance with the amount of compensation in the direction of compensation (see FIGS. 11 and 12). Control clock generating section 300 also provides read clock signal 302 for reading out the picture signal data recorded in response to write clock signal 301, and provides data conversion output signal 303 for determining the time when the pre-compensated picture signal data is convened into the analog signal by data converting section 800. Read clock signal 302 has the frequency of a normal clock. Data conversion output signal 303 has a time delay equal to the blanking period/2 with respect to the normal horizontal digital signal process clock signal.

Memory section 500 has the picture signal data PSD recorded therein with the pixels deleted in the line of unit in accordance with the amount of compensation in the direction of compensation (see FIGS. 11 and 12) in response to switched write clock signal 401 from first switching section 400, and has the recorded picture signal data outputted therefrom after the blanking period multiplied by two in response to switched read clock signal 402 from first switching section 400. Memory section 500 has the picture signal data recorded therein in the line of unit in the system of first-in-first-out.

Figure 8:
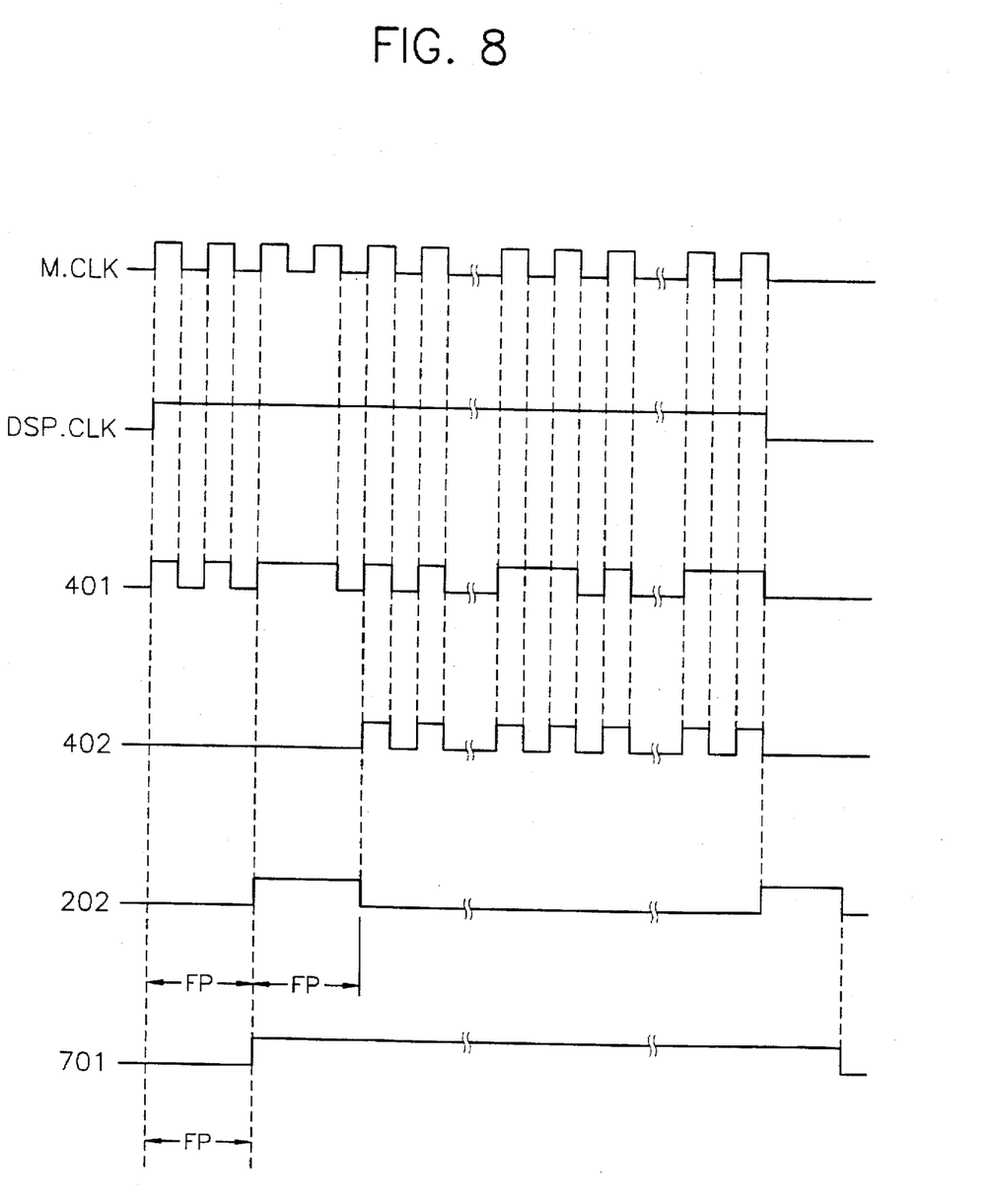
FIG. 8 is a timing diagram for illustrating the operation of the apparatus for pre-compensating an asymmetrical picture shown in FIG. 7.
Figure 9:
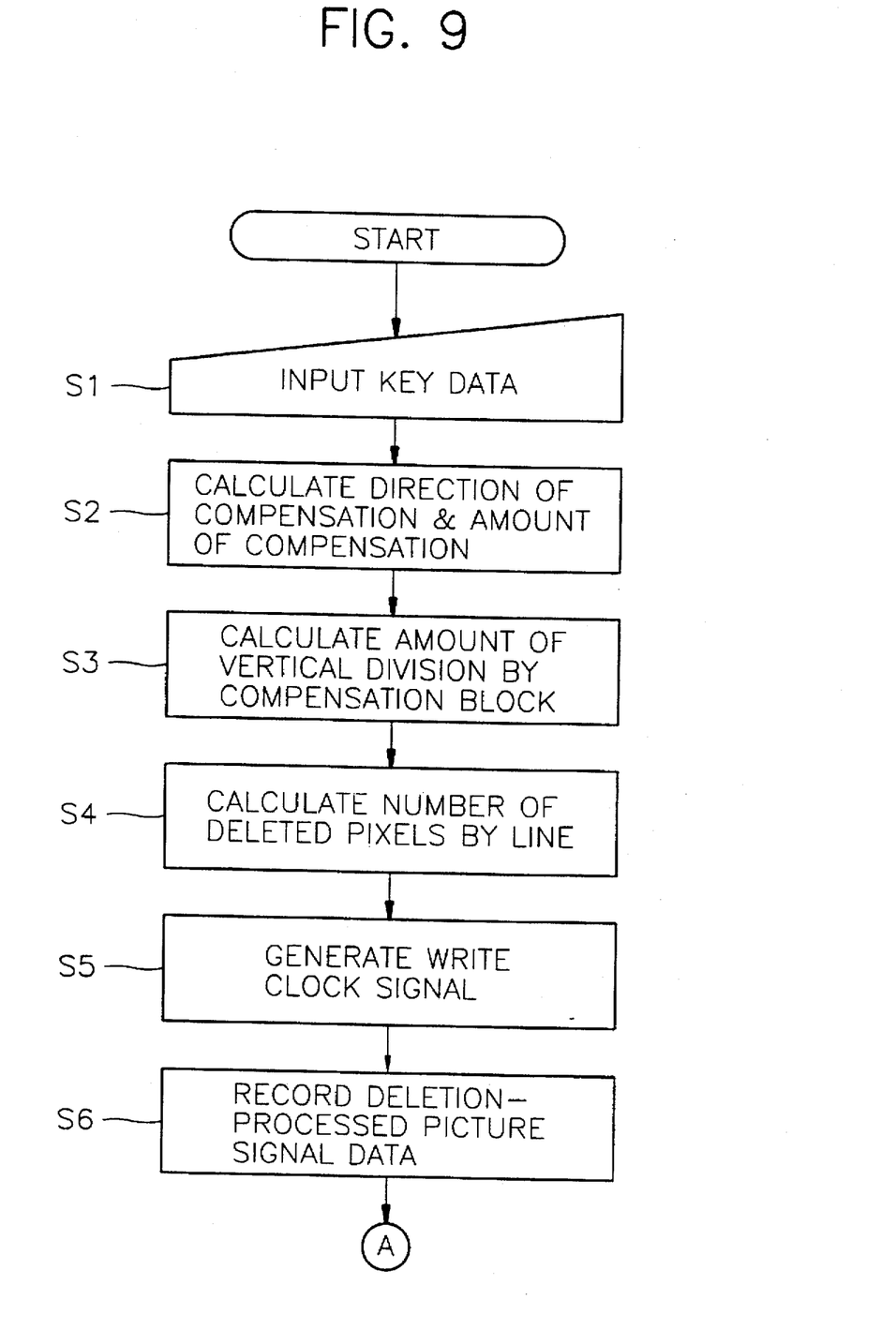
FIGS. 9 and 10 are a flowchart for illustrating a method of pre-compensating an asymmetrical picture with the apparatus for pre-compensating an asymmetrical picture shown in FIG. 7.
Figure 10:
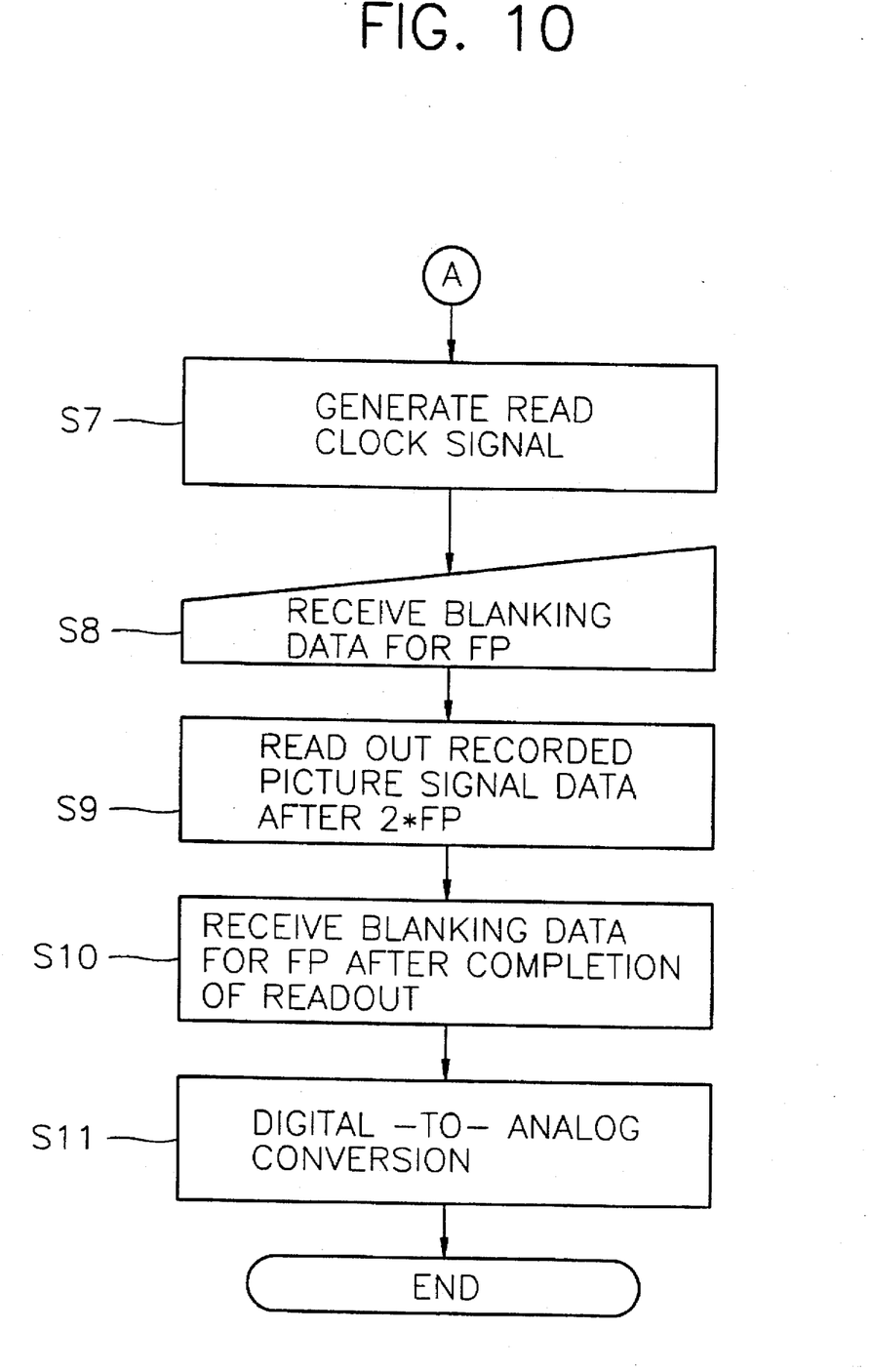

A description will next be made on the procedure of the method for pre-compensating an asymmetrical picture which is executed by the apparatus shown in FIG. 7, in accordance with the flowchart of FIGS. 9 and 10, while referring to the timing diagram of FIG. 8. FIG. 8 is a timing diagram for illustrating the operation of the apparatus for pre-compensating an asymmetrical picture shown in FIG. 7. FIGS. 9 and 10 are a flowchart for illustrating a method of pre-compensating an asymmetrical picture with the apparatus for pre-compensating an asymmetrical picture shown in FIG. 7. In FIG. 8, FP denotes the "blanking period/2".

First, in step S1, controlling section 200 inputs a key data corresponding to projection angle setting signal 101 when a central axis of projection lens 11 installed in projector 10 for projecting a magnified picture on screen 20 is arranged at an upward or downward projection angle with respect to screen 20 (see FIGS. 3 and 5). In step S2, controlling section 200, determines a direction of compensation and calculates an amount of compensation on the basis of the key data inputted in step S1. In step 3, controlling section 200 calculates an amount of a vertical division in the block of unit subjected to the pre-compensation among the total lines of the picture in order to make difference in the number of pixels which will be deleted. In step S4, controlling section 200 calculates in the line of unit a number of pixels which will be deleted. Namely, in steps S2 to S4, controlling section 200 calculates on the basis of the key data inputted in step S1 the parameters related to an operation for pre-compensating an asymmetry of a picture which will be projected onto screen 20. The direction of compensation is "an upward direction" or "a downward direction", and the amount of compensation is "a number of pixels to be deleted in the line of unit". The amount of the vertical division is "(the number of pixels to be deleted)/2".

In step S5, control clock generating section 300 generates write clock signal 301 at a leading edge of main clock signal M.CLK in accordance with the amount of compensation determined in step S2 (see switched write clock signal 401 shown in FIG. 8). In step S6, picture signal data PSD with pixels deleted therefrom in the line of unit, is recorded in memory section 500 in response to write clock signal 301 generated in step S5 in order to generate a picture reversely shaped to the picture which will be projected onto screen 20. In step S7, control clock generating section 300 generates read clock signal 302 at a leading edge of main clock signal M.CLK after the blanking period multiplied by 2 in order to read out the picture signal data which is recorded in step S6 (see switched read clock signal 402 shown in FIG. 8).

In step S8, data converting section 800 receives blanking data BD by switching in the direction of compensation determined in step S2 for the blanking period/2 which is prior to the time when the picture signal data having pixels deleted therefrom in the line of unit read out from memory section 500. In step S9, the picture signal data recorded in step S6 are read out from memory section 500 in the direction of compensation determined in step S2 after the blanking period multiplied by 2 in response to read clock signal 302 generated in step S7. In step S10, data converting section 800 receives blanking data BD by the switching operation in the direction of compensation determined in step S2 for the blanking period from the point when the readout period of the recorded picture signal data in step S9 ends. Namely, in steps S8 to S10, blanking data BD are added to parts of the read picture signal data 501 with pixels deleted therefrom in response to read clock signal 302 generated in step S7.

In step S11, switched picture signal data 601 having switched blanking data 602 added thereto generated in step S8 to S10 are converted in response to switched data conversion output signal 701 (see FIG. 8) into an analog signal and converted picture signal data 801 are generated. Converted picture signal data 801 are provided to projector 10.

Hereinafter, a description of the operation of the apparatus for pre-compensating an asymmetrical picture in a projection system for displaying a picture which has the aforementioned circuit configuration, will be provided as follows.

FIG. 11 is a drawing for illustrating a pre-compensated picture signal when the projection lens is ganged as shown in FIG. 3. In FIG. 11, FP denotes the "blanking period/2". As shown in FIG. 3, when projection lens 11 of projector 10 is arranged at an upward projection angle with respect to screen 20, projection angle setting signal 101 from projection angle setting section 100 is applied to controlling section 200. In response to projection angle setting signal 101, controlling section 200 controls the process for pre-compensating picture signal data PSD in order to project a normal picture (see FIG. 2) on screen 20. As shown in FIG. 4, the picture projected onto screen 20 has the shape of a reverse trapezoid in which width 25A of the upper end is greater than width 26A of the lower end. Therefore, controlling section 200 controls the process for pre-compensating picture signal data PSD in order to form in the shape of trapezoid the picture which will be projected onto screen 20 (see FIG. 11). Namely, controlling section 200 applies record control signal 204 to control clock generating section 300 so that in response to main clock signal M.CLK, control clock generating section 300 can output write clock signal 301 whose frequency is adjusted in the direction of compensation with respect to the upward projection angle (the direction of the arrow shown in FIG. 10).

In response to record control signal 204, control clock generating section 300 outputs write clock signal 301 for executing the process in which the pixels of picture signal data PSD are deleted in the direction of compensation when picture signal data PSD are provided in the line of unit to memory section 500. Namely, at a leading edge of main clock signal M.CLK, control clock generating section 300 outputs write clock signal 301 for recording picture signal data PSD. When first switching control signal 201 from controlling section 200 is applied to first switching section 400, write clock signal 301 is applied to memory section 500 via first switching section 400.

In response to switched write clock signal 401 from first switching section 400, memory section 500 records picture signal data PSD while deleting the pixels of picture signal data PSD in the line of unit in order to produce a picture having a shape reverse to the shape of the picture which will be projected on screen 20 (see FIG. 4). When a normal frequency of read clock signal 302 generated at a leading edge of main clock signal is applied to memory section 500 after blanking period under the control operation of controlling section 200, picture signal data PSD recorded in memory section 500 are read out after blanking period. Controlling section 200 applies second switching control signal 202 to second switching section 600. Then, blanking data BD supplied from outside to second switching section 600 for a duration of blanking period/2, are outputted from second switching section 600 in order to generate pre-compensated picture (see FIG. 11). On the other hand, control section 200 controls memory section 500 to output read picture signal data 501 for a duration of an effective picture signal. When the existence period of the effective picture signal is completed, controlling section 200 controls second switching section 600, and the switching operation of second switching section 600 provides blanking data BD for a duration of blanking period/2.

Thus, both switched picture signal data 601 and switched blanking data 602 are provided from second switching section 600 to data converting section 800. When controlling section 200 applies third switching control signal 203 to third switching section 700, data conversion output signal 303 which has a delay time of blanking period/2, is supplied from control clock generating section 300 to data converting section 800 via third switching section 700. Then, data converting section 800 converts switched picture signal data 601 which has switched blanking data 602 added therein, i.e., picture signal data PSD which has blanking data BD added therein, and applies converted picture signal data 801, i.e., pre-compensated picture signal, to projector 10. Consequently, even when projection lens 11 of projector 10 is arranged at an upward projection angle with respect to screen 20 (see FIG. 3), pre-compensated picture signal (see FIG. 11) is projected onto screen 20 via projection lens 11, so a normal picture (see FIG. 2) is formed on screen 20. Namely, in contrast to the asymmetrical picture (see FIG. 4) which occurs when picture signal data PSD is not pre-compensated, a normal picture is projected onto screen 20.

FIG. 12 is a view for illustrating a pre-compensated picture signal when the projection lens is arranged as shown in FIG. 5. In FIG. 12, FP denotes the "blanking period/2". As shown in FIG. 5, when projection lens 11 of projector 10 is arranged with an downward projection angle with respect to screen 20, projection angle setting signal 101 from projection angle setting section 100 is applied to controlling section 200. In response to projection angle setting signal 101, controlling section 200 controls the process for pre-compensating picture signal data PSD in order to project a normal picture (see FIG. 2) on screen 20. As shown in FIG. 6, the picture projected onto screen 20 has the shape of a trapezoid in which width 25B of the upper end is smaller than width 26B of the lower the lower end. Therefore, controlling section 200 controls the process for pre-compensating picture signal data PSD in order to form in the shape of a reverse trapezoid the picture which will be projected onto screen 20 (see FIG. 12). Namely, controlling section 200 applies record control signal 204 to control clock generating section 300 so that in response to main clock signal M.CLK, control clock generating section 300 can output write clock signal 301 which frequency is adjusted in the direction of compensation with respect to the downward projection angle (the direction of the arrow shown in FIG. 12).

In response to record control signal 204, control clock generating section 300 outputs write clock signal 301 for executing the process in which the pixels of picture signal data PSD are deleted in the direction of compensation when picture signal data PSD is provided in the line of unit to memory section 500. Namely, at a leading edge of main clock signal M.CLK control clock generating section 300 outputs write clock signal 301 for recording picture signal data PSD. When first switching control signal 201 from controlling section 200 is applied to first switching section 400, write clock signal 301 is applied to memory section 500 via first switching section 400.

In response to switched write clock signal 401 from first switching section 400, memory section 500 records picture signal data PSD while deleting the pixels of picture signal data PSD in the line of unit in order to produce a picture having a shape reverse to the shape of the picture which will be projected on screen 20 (see FIG. 6). When a normal frequency of read clock signal 302 generated at a leading edge of main clock signal is applied to memory section 500 after blanking period under the control operation of controlling section 200, picture signal data PSD recorded in memory section 500 are read out after blanking period. Controlling section 200 applies second switching control signal 202 to second switching Section 600. Then, blanking data BD supplied from outside to second switching section 600 for a duration of blanking period/2 is provided from second switching section 600 in order to generate pre-compensated picture (see FIG. 12). On the other hand, control section 200 controls memory section 500 to output read picture signal data 501 for a duration of an effective picture signal. When the existence period of the effective picture signal is completed, controlling section 200 controls second switching section 600, and the switching operation of second switching section 600 provides blanking data BD for a duration of blanking period/2.

Thus, both switched picture signal data 601 and switched blanking data 602 are provided from second switching section 600 to data converting section 800. When controlling section 200 applies third switching control signal 203 to third switching section 700, data conversion output signal 303 which has a delay time of blanking period/2, is supplied from control clock generating section 300 to data converting section 800 via third switching section 700. Then, data converting section 800 converts switched picture signal data 601 which has switched blanking data 602 added therein, i.e., picture signal data PSD which has blanking data BD added therein, and applies converted picture signal data 801, i.e., pre-compensated picture signal, to projector 10. Consequently, even when projection lens 11 of projector 10 is arranged at an downward projection angle with respect to screen 20 (see FIG. 5), pre-compensated picture signal (see FIG. 12) is projected onto screen 20 via projection lens 11, so a normal picture (see FIG. 2) is formed on screen 20. Namely, in contrast to the asymmetrical picture (see FIG. 6) which occurs when the picture signal is not pre-compensated, a normal picture is projected onto screen 20.

In the apparatus and method for pre-compensating an asymmetrical picture in a projector, when the projection lens of the projector is arranged at an upward or a downward projection angle, regardless of the projection angle, the trapezoidal error of the picture projected on the screen is pre-compensated in response to the projection angle setting signal from the projection angle setting section. Namely, the picture is normally projected onto the screen (e.g., a picture in the shape of a rectangle).

As a result, firstly, the picture projected onto the screen will never irritate a user due to the occurrence of the keystoning. Secondly, the arrangement of the projector with respect to the screen is very flexible.

Thirdly, the performance or structural flexibility of the projector is enhanced by using digital circuits and softwares therefor.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. An apparatus for pre-compensating an asymmetrical picture in a projection system for displaying a picture, said apparatus comprising:

means for setting an projection angle and providing a projection angle setting signal when a central axis of a projection lens installed in a projector for projecting a magnified picture on a screen is arranged at an upward or downward projection angle with respect to the screen;

controlling means for providing a control signal in order to control an operation of pre-compensating an asymmetry of the picture which is to be projected on the screen on the basis of the projection angle setting signal of said projection angle setting means;

control clock generating means for providing a record/read clock signal and a data conversion output signal in accordance with the control signal from said controlling means while receiving a main clock signal and a digital signal process clock signal, the write clock signal relating to a process for deleting pixels of the picture signal data;

first switching means for switching the record/read clock signal from said control clock generating means and for providing a switched write clock signal or a switched read clock signal in accordance with the control signal from said controlling means while receiving the digital signal process clock signal, the switched write clock signal relating to the process for deleting pixels of the picture signal data;

memory section for recording the picture signal data which has pixels deleted therefrom and is provided in response to a horizontal synchronizing signal, said memory section outputting the recorded picture signal data while receiving the switched write clock signal or the switched read clock signal from said first switching means;

second switching means for switching in accordance with the control signal from said controlling means between the picture signal data outputted from said memory section in response to the switched read clock signal from said first switching means, and blanking data filled in blanking areas set prior to and after the picture signal data having pixels deleted therefrom, and for providing a switched picture signal data or a switched blanking data;

third switching means for switching the data conversion output signal from said control clock generating means and providing a switched data conversion output signal in accordance with the control signal from said controlling means while receiving the digital signal process clock signal; and data converting means for inputting the switched picture signal data or the switched blanking data from said second switching means in order to form the picture signal data having blanking data added thereto, and for converting the picture signal data having blanking data added thereto into an analog signal, after a first period, in response to the switched data conversion output signal from said third switching means, in order to provide a converted picture signal data.

2. The apparatus for pre-compensating an asymmetrical picture in a projection system for displaying a picture as claimed in claim 1, wherein said controlling means applies to said control clock generating means a record/readout control signal in order to control the process for pre-compensating the asymmetry of the picture which is to be projected onto the screen in response to the projection angle setting signal from said projection angle setting means, a vertical synchronizing signal, and a horizontal synchronizing signal of the picture signal when the projection lens is arranged at the upward or downward projection angle with respect to the screen.

3. The apparatus for pre-compensating an asymmetrical picture in a projection system for displaying a picture as claimed in claim 2, wherein said controlling means calculates an amount of compensation, and determines a direction of compensation of the picture in the pre-compensating process in order to control the generation of the write clock signal from said control clock generating means.

4. The apparatus for pre-compensating an asymmetrical picture in a projection system for displaying a picture as claimed in claim 3, wherein said direction of compensation is an upward direction or a downward direction, and said amount of compensation is a number of pixels to be deleted in the line of unit.

5. The apparatus for pre-compensating an asymmetrical picture in a projection system for displaying a picture as claimed in claim 3, wherein said controlling means applies to said second switching means a second switching control signal for adding the blanking data to the parts of the picture signal in the line of unit in which the pixels are deleted on the basis of the amount of compensation in the line of unit.

6. The apparatus for pre-compensating an asymmetrical picture in a projection system for displaying a picture as claimed in claim 3, wherein said controlling means adjusts the waveform of the write clock signal from said control clock generating means and controls the process in which the pixels of the picture signal data are deleted in the line of unit in accordance with the amount of compensation in the direction of compensation while recording the picture signal data in said memory section.

7. The apparatus for pre-compensating an asymmetrical picture in a projection system for displaying a picture as claimed in claim 6, wherein said controlling means controls said first switching means in order to read out the picture signal data in the line of unit while the recorded picture signal data is read out from said memory section in response to the read clock signal from said control clock generating means.

8. The apparatus for pre-compensating an asymmetrical picture in a projection system for displaying a picture as claimed in claim 7, wherein said controlling means adjusts the generation of the second switching control signal therefrom in order to add the blanking data in the direction of compensation prior to and after the picture signal data for the first period by the switching operation of said second switching means while reading out the picture signal data recorded in the line of unit.

9. The apparatus for pre-compensating an asymmetrical picture in a projection system for displaying a picture as claimed in claim 1, wherein said control clock generating means provides the write clock signal for controlling the recording in said memory section the picture signal data with the pixels deleted therefrom in the line of unit in accordance with the amount of compensation in the direction of compensation, provides the read clock signal for reading out the picture signal data recorded in response to the write clock signal, and provides the data conversion output signal for determining the time when the pre-compensated picture signal data is converted into the analog signal by said data converting means.

10. The apparatus for pre-compensating an asymmetrical picture in a projection system for displaying a picture as in claim 6, wherein said read clock signal has the frequency of a normal clock.

11. The apparatus for pre-compensating an asymmetrical picture in a projection system for displaying a picture as claimed in claim 9, wherein said data conversion output signal has a time delay equal to the first period with respect to the normal horizontal digital signal process clock signal.

12. The apparatus for pre-compensating an asymmetrical picture in a projection system for displaying a picture as claimed in claim 9, wherein said memory section has the picture signal data recorded therein with the pixels deleted in the line of unit in accordance with the amount of compensation in the direction of compensation in response to the switched write clock signal from said first switching means, and has the recorded picture signal data outputted therefrom after the first period multiplied by two in response to the switched read clock signal from said first switching means.

13. The apparatus for pre-compensating an asymmetrical picture in a projection system for displaying a picture as claimed in claim 12, wherein said memory section has the picture signal data recorded therein in the line of unit in the system of first-in-first-out.

14. The apparatus for pre-compensating an asymmetrical picture in projection system for displaying a picture as in claim 1, wherein said first period corresponds to half a blanking period.

15. A method for pre-compensating an asymmetrical picture in a projection system for displaying a picture, said method comprising the steps of:

(i) inputting a key data corresponding to a projection angle setting signal when a central axis of a projection lens installed in a projector for projecting a magnified picture on a screen is arranged at an upward or downward projection angle with respect to the screen;

(ii) calculating on the basis of the key data inputted in step (i) parameters related to an operation for pre-compensating an asymmetry of a picture which is to be projected onto the screen;

(iii) generating a write clock signal at a leading edge of a main clock signal in accordance with the amount of compensation determined in step (ii);

(iv) recording a picture signal data with pixels deleted therefrom in the line of unit in response to the write clock signal generated in step (iii) in order to generate a picture reversely shaped to the picture which is to be projected onto the screen;

(v) generating a read clock signal at a leading edge of the main clock signal after a first period multiplied by 2 in order to read out the picture signal data;

(vi) adding a blanking data to parts of the read picture signal data with pixels deleted therefrom in response to the read clock signal generated in step (v); and (vii) converting in response to a data conversion output signal the picture signal data having the blanking data added thereto generated in step (vi) into an analog signal and generating a converted picture signal data.

16. The method for pre-compensating an asymmetrical picture in a projection system for displaying a picture as claimed in claim 15, wherein said data conversion output signal has a time delay equal to the first period with respect to the normal horizontal digital signal process clock signal.

17. The method for pre-compensating an asymmetrical picture in a projection system for displaying a picture as claimed in claim 15, wherein said read clock signal has the frequency of a normal clock.

18. The method for pre-compensating an asymmetrical picture in a projection system for displaying a picture as claimed in claim 15, wherein said step (ii) comprises the substeps of:

(a) determining a direction of compensation and calculating an amount of compensation on the basis of the key data inputted in step (i);

(b) calculating an amount of a vertical division in the block of unit subjected to the pre-compensation among the total lines of the picture in order to make difference in the number of pixels which are to be deleted; and (c) calculating in the line of unit a number of pixels which are to be deleted.

19. The method for pre-compensating an asymmetrical picture in a projection system for displaying a picture as claimed in claim 18, wherein said direction of compensation is an upward direction or a downward direction, and said amount of compensation is a number of pixels to be deleted in the line of unit.

20. The method for pre-compensating an asymmetrical picture in a projection system for displaying a picture as claimed in claim 19, wherein said amount of the vertical division is half the number of pixels to be deleted.

21. The method for pre-compensating an asymmetrical picture in a projection system for displaying a picture as claimed in claim 15, wherein said step (vi) comprises the substeps of:

(A) receiving the blanking data by switching in the direction of compensation determined in step (ii) for the first period prior to when the picture signal data having pixels deleted therefrom in the line of unit is read out;

(B) reading out the picture signal data recorded in step (iv) in the direction of compensation determined in step (ii) after the first period multiplied by 2 in response to the read clock signal generated in step (v); and (C) receiving the blanking data by the switching operation in the direction of compensation determined in step (ii) for the first period from the point when the readout period of the recorded picture signal data in step (B) ends.

22. The method for pre-compensating an asymmetrical picture in projection system for displaying a picture as in claim 15, wherein said first period corresponds to half a blanking period.

* * * * *